Sept. 15, 1964 F. A. FRICK ETAL 3,148,819

PINCH ROLLER ACTUATING MECHANISM

Filed Sept. 4, 1962

FRITZ A. FRICK &
JOHN H. STREETS
INVENTORS

BY Robert G. Clay

ATTORNEY

United States Patent Office 3,148,819
Patented Sept. 15, 1964

3,148,819

PINCH ROLLER ACTUATING MECHANISM

Fritz A. Frick and John H. Streets, Redwood City, Calif., assignors to Ampex Corporation, Redwood City, Calif., a corporation of California Filed Sept. 4, 1962, Ser. No. 221,215
9 Claims. (Cl. 226—176)

Figures 1, 2:
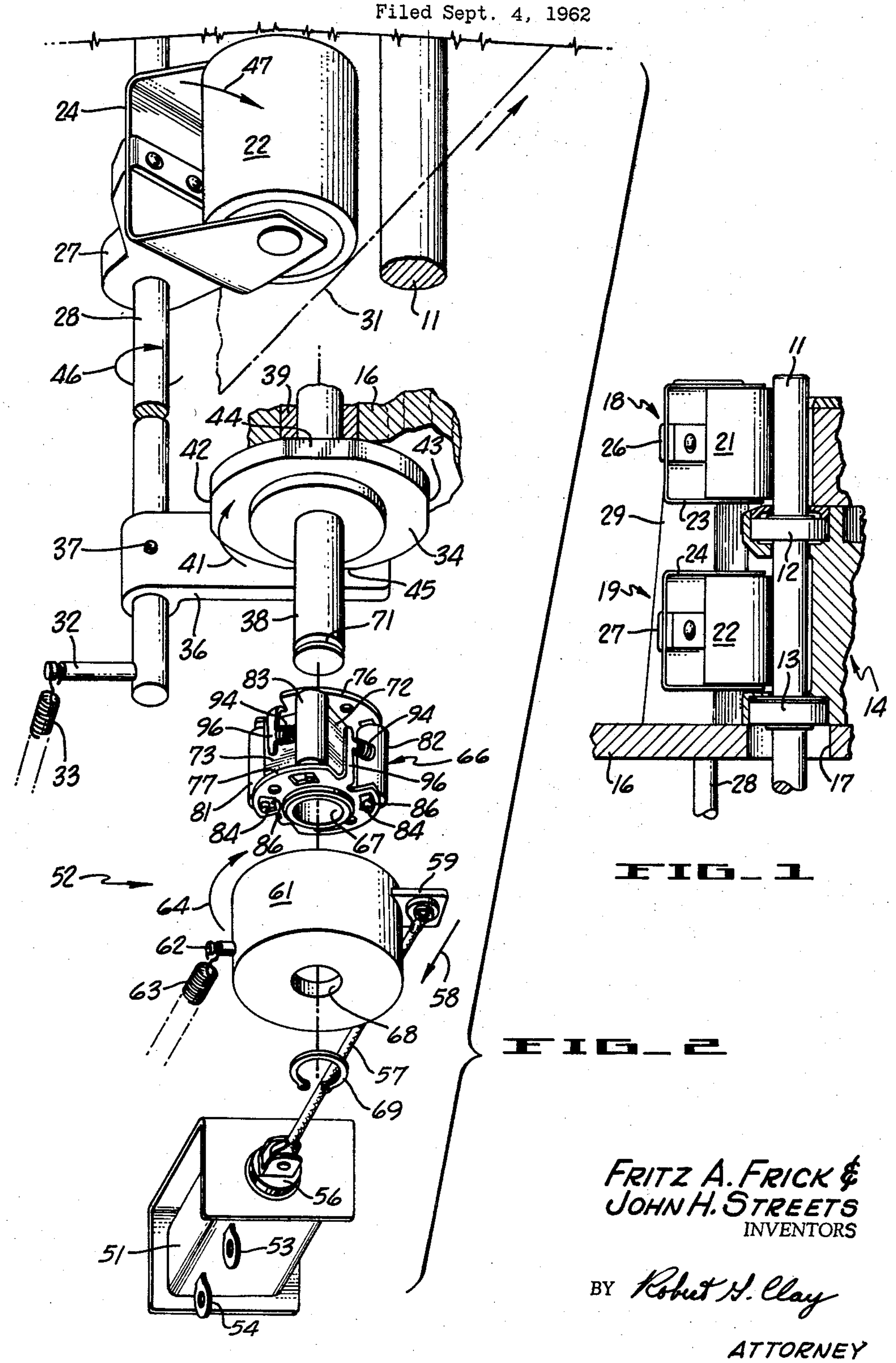

This invention relates to magnetic tape transports, and particularly to actuating means for a capstan pinch roller.

In the magnetic tape transport art, the magnetic tape is usually driven by a rotating capstan with a clamping pinch roller being mounted on a pivoting arm for movement between retracted and engaged positions and being moved by an actuating means. However, such arrangements usually require that a solenoid be continuously energized during the recording and playing modes of operation of the machine, and electrical energy is continuously consumed. Also the probability is greatly increased that malfunctioning of the solenoid will cause malfunctioning of the pinch roller.

Accordingly, it is an object of the present invention to provide a pinch roller actuating mechanism that consumes a minimum amount of energy and malfunctions more rarely.

It is another object of the invention to provide a pinch roller actuating mechanism that is energized only for engaging and retracting the roller and does not have to be continuously energized during the operation of the machine.

It is still another object of the invention to provide a pinch roller actuating mechanism that exerts a predetermined amount of clamping pressure and that locks into engaged clamping position without the need for application of holding or maintaining forces.

In accordance with the invention, a pinch roller is mounted on an arm extending from a rotatable shaft so as to pivot between retracted and engaged positions with respect to a capstan. Spring means are provided to continuously urge the roller toward retracted position. A cam, rotating in only one direction, has high and low portions engaging a cam follower arm extending from the shaft. When a high portion of the cam engages the follower, the roller is pivoted to engaged position against the urging of the spring means. When a low portion of the cam engages the follower, the roller is permitted to retract under the urging of the spring means. A ratchet-type mechanism, in the form of a friction clutch, is provided to rotate the cam in unidirectional steps, for bringing the high and low portions of the cam alternately into engagement with the follower. A solenoid having a reciprocating armature is used to operate the ratchet mechanism. Thus upon each energization and de-energization cycle of the solenoid, the cam is advanced one step, and the roller is either engaged or retracted.

Further objects and advantages together with a better understanding of the invention may be had by reference to the following description, taken in conjunction with the accompanying drawings, in which:

FIGURE 1 is a sectional elevation of a portion of the mechanism of the invention mounted in a magnetic tape transport; and FIGURE 2 is an exploded perspective, to an enlarged scale, of the mechanism of the invention.

Referring now to the drawing and particularly to FIGURE 1 there is shown a typical capstan and pinch roller assembly mounted in a magnetic tape transport and suitable for application of the invention therewith. A capstan 11 is journaled as by means of anti-friction bearings 12 and 13 in a solid mounting 14 affixed to the upper portion of the transport top plate 16. The capstan extends downwardly through a suitable opening 17 in the top plate to a capstan driving mechanism (not shown). The capstan is suitable for driving two different portions of tape simultaneously in the same direction at an upper level 18 and a lower level 19. Accordingly two separate pinch rollers 21 and 22 are used and are mounted at the respective levels 18 and 19 as by means of yokes 23 and 24 each rigidly secured as by means of respective arms 26 and 27 to a common actuating shaft 28 that is journaled in a mounting 29 affixed to the top plate 16. The shaft 28 likewise extends downwardly through the top plate to an actuating mechanism that is arranged to cause reciprocal rotation of the shaft 28 and pivoting of the arms 26, 27 and yokes 23, 24 about the axis of the shaft for alternate engagement and retraction of the pinch rollers 21, 22 with respect to the capstan.

Referring now to FIGURE 2, the actuating mechanism for the pinch rollers, which comprises the structure of the invention, is shown in detail. The lower level pinch roller 22 is shown in retracted position with respect to the capstan 11, and a tape 31 is shown in phantom as extending between the roller and capstan in position to be engaged thereby. A pin 32 extends from the lower portion of the shaft 28 in a radial direction and is coupled to a tension spring 33 which continuously urges the shaft to rotate in the direction needed to retract the pinch roller from the capstan. In order to engage the roller with the capstan, a rotating cam 34 is provided, and a cam follower arm 36 is affixed as by a pin 37 to the lower portion of the shaft 28. The cam 34 is mounted securely on a shaft 38 that is journaled in a bearing 39 mounted in the top plate 16; and the shaft and cam rotate always in the same direction as illustrated by the arrow 41. The cam is substantially ellipsoidal in form and has four flat portions 42, 43, 44 and 45, portions 42, 43 being located at the ends of the maximum diameter of the cam and the portions 44, 45 being located at the ends of the minimum diameter of the cam. The portions 42, 43 thus constitute "high" portions and the portions 44, 45 constitute "low" portions of the cam. In the position illustrated, the cam follower arm 36 is engaged by one of the low portions 45 of the cam, which arrangement will be readily understood to permit the spring 33 to retract the roller 22 from the capstan 11. Upon further rotation in the direction of the arrow 41 through an angle of 90°, the high portion 43 of the cam engages the arm 36, causing rotation of the shaft 28 and the arm, yoke and roller assembly 27, 24 and 22 in the direction illustrated by arrows 46 and 47 respectively, so as to cause engagement of the roller 22 against the tape 31 and clamping of the tape to the capstan 11. Upon further rotation of the cam 34 in the direction of arrow 41, the low portion 44 of the cam engages the arm 36, permitting retraction of the pinch roller under the urging of the spring 33, and so on.

It will be understood that the cam follower 36 might alternatively be formed with a pin engaging a groove in the cam 34, the groove having the same outline as the illustrated periphery of the cam, in which case the spring 33 would not be needed.

It is here noted that the shaft 28 has a predetermined torsional flexibility, so that upon clamping engagement of the roller, the lower end of the shaft is actually rotated slightly further than the upper portion to which the roller is mounted, and the shaft thereby constitutes a torsional spring loading the roller to exert a predetermined clamping pressure against the tape and capstan.

Now it will be understood that because of the flat portions 44–45 of the cam and the spring loading of the apparatus above described, the cam in any of the four roller engaging and retracting positions locks into position and securely holds the roller either engaged or retracted, as desired. It follows therefore, that the force that is required to rotate the cam 34 from one position to the next needs to be applied only at the instant of engagement or retraction of the roller and does not have to be continuously maintained during the extended periods when the roller is engaged or retracted.

The unidirectional rotation of the cam 34 in the direction of arrow 41 is accomplished by means of a reciprocating solenoid 51 operating through a type of ratchet mechanism 52. The solenoid 51 has a pair of electrical leads 53 and 54 which when energized cause longitudinal movement of an armature 56 and a tension coupling member 57 in the direction of arrow 58. The other end of the tension member 57 is coupled to an arm 59 extending radially from a hollow cylindrical rotating housing 61 of the ratchet device. A pin 62 also extends radially from the housing 61 and is coupled to a tension spring 63 which urges the housing, the member 57 and the armature 56 of the solenoid continuously in a direction opposite to that of the arrow 58. Thus upon energization of the solenoid, the housing 61 is rotated substantially 90° in the direction of arrow 64, but upon deenergization of the solenoid the housing is returned 90° to its original position.

The interior mechanism of the ratchet device 52 is indicated generally by an arrow 66 and is formed with a central opening 67 by which it is press-fitted and solidly mounted upon the shaft 38 of the cam 34. The housing 61, which has a central opening 68 is also mounted on the shaft 38 for relatively free rotation with respect thereto and is axially secured on the shaft as by means of a split ring 69 engaging a suitable recess 71 in the end of the shaft 38. The interior mechanism 66 includes a central portion having four flat surfaces of which two, numbered 72 and 73 respectively, are shown, and a pair of substantially circular end walls 76 and 77 for mounting four rollers of which three, numbered 81, 82 and 83, are shown. Each roller is arranged in axial parallelism with the shaft 38 and is arranged to roll in a circumferential direction along a corresponding one of the flat portions 72, 73, the rollers each having an extending axle 84 fitting loosely into suitable opening 86 formed in the walls 76 and 77 for guiding the rollers in their movements. It will be seen that each roller in its circumferential movement along the corresponding flat portions 72, 73 also moves in a direction radially outward or radially inward with respect to the axis of the shaft 38. Each roller at its most extreme limit of circumferential movement projects slightly above the edges of the walls 76, 77 and wedgingly engages the interior surface of the housing 61. Compression springs 94 are provided to urge each roller in such movement in a direction corresponding to that of the arrow 64, and the springs are mounted as by means of ears 96 extending from the walls 76 and 77. Thus it will be seen that upon movement of the housing 61 in the direction of the arrow 64, the wedging action of the rollers causes the interior mechanism 66 of the clutch coupling to rotate in the same direction, but upon return movement of the housing 61 in an opposite direction, the rollers are caused to move slightly radially inward and in such a way that the coupling to the shaft 38 is broken and no reverse movement of the shaft 38 results.

In operation, beginning with the pinch roller 22 in a retracted position and the solenoid 51 in a de-energized condition, the solenoid is energized to cause a quadrant rotation of the housing 61 in the direction of arrow 64. The action of the rollers 82, 83 wedging between the housing 61 and the flat portions 72, 73 causes the interior mechanism 66 and shaft 38 to rotate in the same direction and the cam to rotate 90° in the direction of arrow 41. The arm 36 is then engaged with high flat portion 43 of the cam 34 and is pivoted so as to cause rotation of the shaft 28 in the direction of arrow 46 and movement of the pinch roller 22 in the direction of arrow 47 to clamp the tape 31 against the capstan 11. As soon as the movement has been completed, the solenoid 51 is de-energized, and the spring 63 causes return movement of the housing 61 to its original position. The action of the rollers 81–83 however in this instance permits slipping of the housing 61 with respect to the interior mechanism 66, and the cam 34 remains in position with the high flat portion 43 still engaging the arm 36. Upon a subsequent energization of the solenoid 51, the clutch-like ratchet assembly 52 in a similar manner causes a quadrant rotation of the cam 34 to bring the low flat portion 44 into engagement with the arm 36, and the spring 33 causes rotation of the shaft 28 in a direction opposite to the arrow 46 so as to return the pinch roller 22 to retracted position. As soon as this movement is completed, the solenoid 51 is de-energized and the spring 63 returns the housing 61 to its original position without changing the position of the cam 34, the apparatus is ready for a new cycle of operation.

Thus there has been described an apparatus in which a pinch roller is mounted on an arm extending from a rotatable shaft so as to pivot between retracted and engaged positions with respect to a capstan. Spring means are provided to continuously urge the roller toward retracted position. A cam, rotating in only one direction, has high and low portions engaging a cam follower arm extending from the shaft. When a high portion of the cam engages the follower, the roller is pivoted to engaged position against the urging of the spring means. When a low portion of the cam engages the follower, the roller is permitted to retract under the urging of the spring means. A ratchet-type mechanism, in the form of a friction clutch, is provided to rotate the cam in unidirectional steps, for bringing the high and low portions of the cam alternately into engagement with the follower. A solenoid having a reciprocating armature is used to operate the ratchet mechanism. Thus upon each energization and de-energization cycle of the solenoid, the cam is advanced one step, and the roller is either engaged or retracted.

What is claimed is:

1. In an actuating means for a pinch roller pivotably mounted on a rotatable shaft for selective engagement and disengagement with a rotating capstan, the combination comprising:

means coupled to said shaft for causing rotation of said shaft between engaged and retracted positions of said pinch roller with respect to said capstan; and a second means for positively locking said pinch roller into said engaged position so that said pinch roller remains in said engaged position when said first-named means is de-energized;

whereby operating energy is required only during pivoting action of said pinch roller from one of said positions to the other.

2. In an actuating means for a pinch roller pivotably mounted on a rotatable shaft for selective engagement and disengagement with a rotating capstan, the combination comprising:

means coupled to said shaft for causing rotation of said shaft between engaged and retracted positions of said pinch roller with respect to said capstan; and a second means for positively locking said pinch roller into said engaged position so that said pinch roller remains in said engaged position when said first-named means is de-energized;

said last-named means including a unidirectionally rotating cam engaging said first-named means, and ratchet means coupled to said cam for causing unidirectional rotation thereof upon application of operating force to said ratchet means.

3. In an actuating means for a pinch roller pivotably mounted on a rotatable shaft for selective engagement and disengagement with a rotating capstan, the combination comprising:

means coupled to said shaft for causing rotation of said shaft between engaged and retracted positions of said pinch roller with respect to said capstan; and a second means for positively locking said pinch roller into said engaged position so that said pinch roller remains in said engaged position when said first-named means is de-energized;

said last-named means including a unidirectionally rotating cam engaging said first-named means, ratchet means coupled to said cam for causing unidirectional rotation thereof upon application of operating force to said ratchet means, and a reciprocating solenoid coupled to said ratchet means for applying said operating force selectively thereto.

4. In an actuating mechanism for a capstan pinch roller pivotably mounted on a rotatable shaft for pivoting motion between retracted and engaged positions with respect to said capstan, the combination comprising:

means coupled to said shaft for urging rotation of said roller to one of said positions;

cam follower means coupled to said shaft, and cooperating cam means mounted for unidirectional rotation to cause cyclical movement of said shaft and roller toward the other of said positions, alternating with release of said shaft and roller for movement under the urging of said first-named means toward said one position;

means having an output portion coupled to said cam means and an input portion for causing said unidirectional rotation of said cam means upon reciprocal movement of said input portion; and reciprocating actuating means coupled to said input portion of said last-named means for causing said reciprocal motion thereof.

5. In an actuating mechanism for a capstan pinch roller mounted on a rotatable shaft for pivoting motion between retracted and engaged positions with respect to said capstan, the combination comprising:

spring means coupled to said shaft for urging rotation of said roller to one of said positions;

cam follower means coupled to said shaft, and cooperating cam means mounted for unidirectional rotation to cause cyclical movement of said shaft and roller toward the other of said positions, alternating with release of said shaft and roller for movement under the urging of said spring means toward said one position;

ratchet clutch means having an output portion coupled to said cam means and an input portion for causing said unidirectional rotation of said cam means upon reciprocal movement of said input portion of said clutch means;

spring means coupled to said input portion of said ratchet clutch means for urging said input portion in a return direction opposite to said unidirectional rotation of said cam means; and a solenoid coupled to said input portion of said ratchet clutch means for urging said output portion thereof and said cam means in said unidirectional movement upon energization of said solenoid, and for permitting said return movement of said input portion under the urging of said last named spring means upon de-energization of said solenoid;

whereby said solenoid may be energized for alternately engaging and retracting said pinch roller and may be returned to de-energized condition during the extended periods when said roller is continuously engaged or retracted.

6. In an actuating mechanism for a capstan pinch roller mounted on a rotatable shaft for pivoting motion between retracted and engaged positions with respect to said capstan, the combination comprising:

spring means coupled to said shaft for urging rotation of said roller to one of said positions;

an arm mounted on said shaft and extending radially therefrom;

a cam mounted for rotation about an axis parallel to that of said shaft, said cam having portions of varying radius engaging said arm during unidirectional rotation so as to induce cyclical rotation of said shaft and roller toward the other of said positions, alternating with release of said shaft and roller for movement under the urging of said spring means toward said one position;

ratchet clutch means having an output portion coupled to said cam means and an input portion for causing said unidirectional rotation of said cam means upon reciprocal movement of said input portion of said ratchet clutch means; and reciprocating actuating means coupled to said ratchet clutch input portion for causing said reciprocal motion thereof.

7. In an actuating mechanism for a capstan pinch roller mounted on a rotatable shaft for pivoting motion between retracted and engaged positions with respect to said capstan, the combination comprising:

said shaft and roller being spring loaded toward said retracted position;

said shaft being torsionally resilient so as to cause spring loading of said roller for a predetermined engagement pressure against said capstan;

an arm mounted on said shaft and extending radially therefrom;

rotating cam means engaging said arm and mounted for unidirectional rotation to cyclically move said arm between depressed and released positions, said arm in said depressed position thereof causing rotation of said shaft to said engaged position of said pinch roller and torsional flexing of said shaft to induce a predetermined bearing pressure of said roller against said capstan, and said arm in said released position permitting movement of said shaft and roller to said retracted position thereof under the urging of said spring;

clutch means having an output portion coupled to said cam means and an input portion for causing said unidirectional movement of said cam means upon reciprocal movement of said input portion of said clutch means;

reciprocating actuating means coupled to said clutch input portion for causing said reciprocal motion thereof.

8. In an actuating mechanism for a capstan pinch roller mounted on a rotatable shaft for pivoting motion between retracted and engaged positions with respect to said capstan, the combination comprising:

said shaft and roller being spring loaded toward said retracted position;

said shaft being torsionally resilient so as to cause spring loading of said roller for a predetermined engagement pressure against said capstan;

an arm mounted on said shaft and extending radially therefrom;

a cam mounted for rotation about an axis parallel to that of said shaft, said cam having portions of varying radius engaging said arm during unidirectional rotation so as to cyclically move said arm between depressed and released positions, said arm in said depressed position thereof causing rotation of said shaft to said engaged position of said pinch roller and torsional flexing of said shaft to induce a predetermined bearing pressure of said roller against said capstan, and said arm in said released position permitting movement of said shaft and roller to said retracted position thereof under the urging of said spring;

clutch means having an output portion coupled to said cam means and an input portion for causing said unidirectional movement of said cam means upon reciprocal movement of said input portion of said clutch means;

spring means coupled to said input portion of said clutch means for urging said input portion in a return direction opposite to said unidirectional rotation of said cam means; and a solenoid coupled to said input portion of said clutch means for urging said output portion thereof and said cam means in said unidirectional movement upon energization of said solenoid, and for permitting said return movement of said input portion under the urging of said last named spring means upon de-energization of said solenoid;

whereby said solenoid may be energized for alternately engaging and retracting said pinch roller and may be returned to de-energized condition during the extended periods when said roller is continuously engaged or retracted.

9. In an actuating mechanism for a capstan pinch roller mounted on a rotatable first shaft for pivoting motion between retracted and engaged poistions with respect to said capstan, the combination comprising:

said first shaft and roller being spring loaded toward said retracted position;

said first shaft being torsionally resilient so as to cause spring loading of said roller for a predetermined engagement pressure against said capstan;

an arm mounted on said first shaft and extending radially therefrom;

a second shaft and a cam mounted thereon for axial rotation about an axis parallel to that of said first shaft, said cam having portions of varying radius engaging said arm during unidirectional rotation so as to cyclically move said arm between depressed and released positions, said arm in said depressed position thereof causing rotation of said first shaft to said engaged position of said pinch roller and torsional flexing of said first shaft to induce a predetermined bearing pressure of said roller against said capstan, and said arm in said released position permitting movement of said first shaft and roller to said retracted position thereof under the urging of said spring;

a clutch mounted on said second shaft, said clutch having an output portion affixed to said second shaft and including means for mounting a plurality of rollers in axial parallelism with said second shaft and for limited generally circumferential movement with respect to said second shaft, said mounting means being arranged to cause inclined movement of said rollers radially outwardly upon said circumferential movement of said rollers in the direction of said unidirectional movement and spring means urging said rollers in said direction of said unidirectional movement with respect to said output portion, said clutch also having an input portion mounted for free axial rotation on and with respect to said second shaft, said input portion including a hollow cylindrical housing portion surrounding and frictionally engaging said rollers so as to cause wedging of said rollers between and coupling of said input and output portions for conjoint rotation when said input portion is rotated in the direction of said unidirectional movement, and so as to cause loosening of said rollers between and de-coupling of said input and output portions when said input portion is rotated oppositely to the direction of said unidirectional movement;

spring means coupled to said input portion of said clutch means for urging said input portion in a return direction opposite to said unidirectional rotation of said cam means; and a solenoid coupled to said input portion of said clutch means for urging said output portion thereof and said cam means in said unidirectional movement upon energization of said solenoid, and for permitting said return movement of said input portion under the urging of said last named spring means upon de-energization of said solenoid;

whereby said solenoid may be energized for alternately engaging and retracting said pinch roller and may be returned to de-energized condition during the extended periods when said roller is continuously engaged or retracted.

References Cited in the file of this patent

UNITED STATES PATENTS

| | | |
|---|---|---|
| 2,909,337 | Lahti et al. | Oct. 20, 1959 |
| 2,999,625 | Lapointe | Sept. 12, 1961 |
| 3,001,733 | Axon et al. | Sept. 26, 1961 |
| 3,100,071 | Neff | Aug. 6, 1963 |